United States Patent [19]

Newacheck et al.

[11] Patent Number: 5,334,840

[45] Date of Patent: Aug. 2, 1994

[54] NEUTRON DETECTOR AND METHOD

[75] Inventors: Richard L. Newacheck, Lafayette; Ivan E. Lamb, Berkeley; R. R. Tsukimura, Walnut Creek, all of Calif.

[73] Assignee: Aerotest Operations, San Ramon, Calif.

[21] Appl. No.: 923,382

[22] Filed: Jul. 31, 1992

[51] Int. Cl.⁵ ............................ G01T 3/00; G01T 3/06
[52] U.S. Cl. .......................... 250/483.1; 250/390.01; 250/390.02
[58] Field of Search ............... 250/390.01, 390.02, 250/483.1, 361 R, 390.11

[56] References Cited

U.S. PATENT DOCUMENTS

| | | | |
|---|---|---|---|
| 2,945,128 | 7/1960 | Sun et al. | 250/390.11 X |
| 4,620,939 | 11/1986 | Maeda et al. | 250/361 R X |
| 5,130,549 | 7/1992 | Davies et al. | 250/484.1 |

OTHER PUBLICATIONS

Ananthanaramanan et al., "Boron Compounds for Thermal Neutron Detection", Nucl. Inst. & Meth., vol. 118, 1974, pp. 45–48.

Okawara et al., 'Neutron Radiography of Fast Transient Processes', Nuclear Technology, vol. 31, Nov. 1976, pp. 250–256.

Matsumoto et al., 'A Boron Nitride Scintillation Converter for Neutron Radiography', Materials Evaluation, 42, Oct. 1984, pp. 1379–1388.

*Primary Examiner*—Paul M. Dzierzynski
*Assistant Examiner*—Edward J. Glick
*Attorney, Agent, or Firm*—Flehr, Hohbach, Test, Albritton & Herbert

[57] ABSTRACT

Neutron detector and method utilizing carbon infiltrated boron nitride in its hexagonal form. When exposed to thermal neutrons, this material has been found to scintillate or emit more photons of light per thermal neutron than materials heretofore employed as neutron detectors. The emission of light is further enhanced by enriching the boron nitride in Boron-10, and for neutron radiography, a single emulsion film is placed in direct contact with a carbon activated face of the boron nitride.

14 Claims, 1 Drawing Sheet

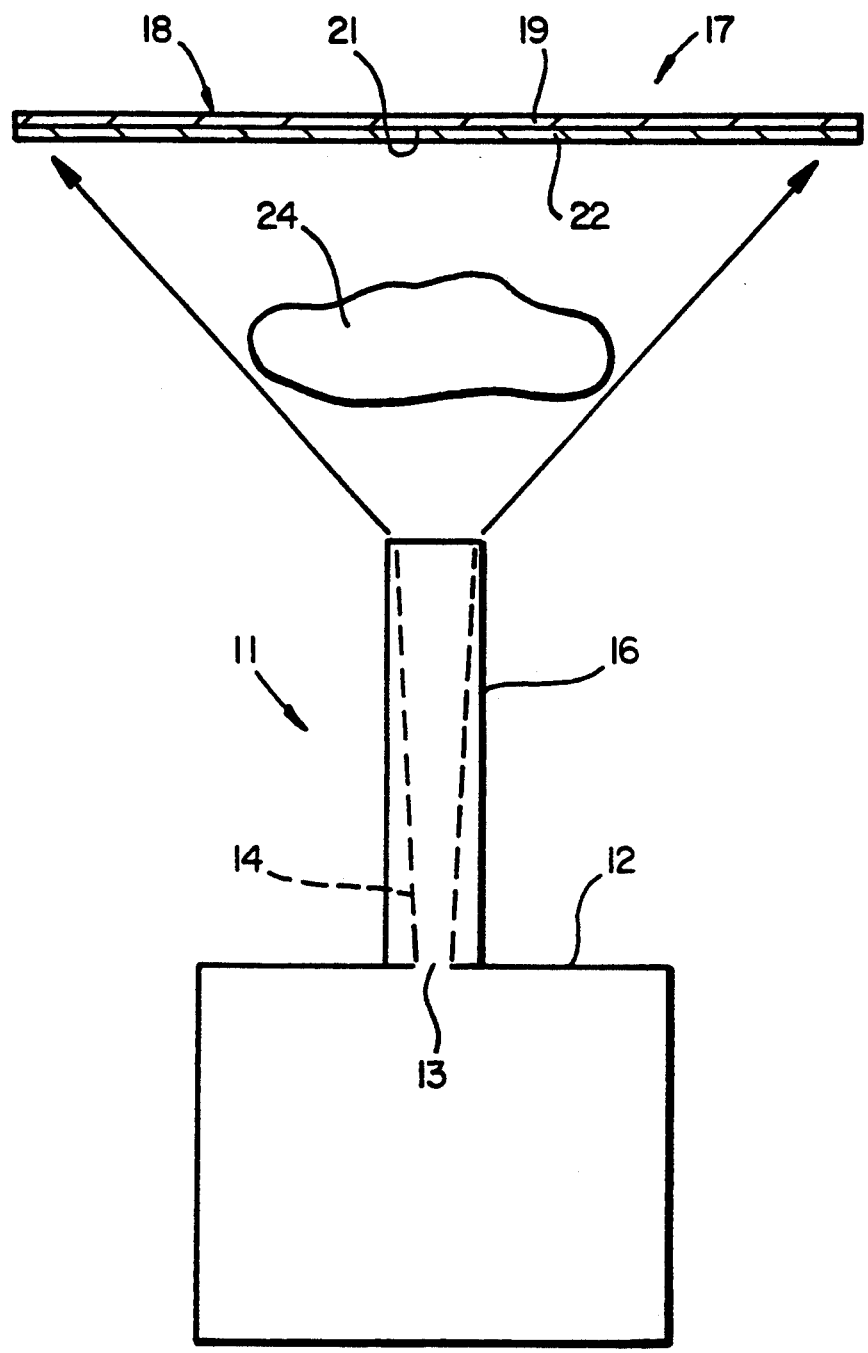

NEUTRON DETECTOR AND METHOD

BACKGROUND OF THE INVENTION

1. Field of Invention

This invention pertains generally to neutron detection and, more particularly, to a neutron detector and method utilizing a material which emits light when acted upon by thermal neutrons.

2. Related Art

Neutrons are difficult to detect because, being uncharged elementary particles, they do not ionize matter as they pass through it. It is, therefore, necessary to rely upon some other form of physical reaction to indicate the presence of neutrons.

One area in which the detection of neutrons is employed is neutron radiography where thermal neutrons are used as the penetrating radiation to produce images of parts or materials on film. Thermal neutrons are produced by fissioning, or splitting, Uranium-235 atoms or other fissionable atoms in a nuclear reactor, following which the velocity of the neutrons is reduced to very slow, or "thermal", energies. The thermal neutrons are passed through the part or material to be examined.

Unlike X-rays which sensitize radiographic film directly, neutrons pass through the film without substantial interaction with the emulsion. Therefore, the film is backed with a conversion screen having a thin film of a material such as gadolinium which absorbs the neutrons, becomes radioactive and sensitizes the emulsion by the emission of radiation in the form of light and/or electrons. Other materials which fluoresce or scintillate when struck by thermal neutrons and have heretofore been utilized in conversion screens for neutron radiography include gadolinium oxysulfide and lithium fluoride.

The materials heretofore utilized as thermal neutron detectors have certain limitations and disadvantages. High quality gadolinium screens are a specialized product which in recent years have become extremely difficult to obtain. Also, with gadolinium screens, there is a problem of stray film darkening from gamma rays which result from the gadolinium capture of neutrons.

OBJECTS AND SUMMARY OF THE INVENTION

It is in general an object of the invention to provide a new and improved detector and method for detecting thermal neutrons.

Another object of the invention is to provide a neutron detector and method of the above character which overcome the limitations and disadvantages of neutron detectors heretofore provided.

Another object of the invention is to provide a neutron detector and method of the above character which are particularly suitable for use in neutron radiography.

These and other objects are achieved in accordance with the invention by using carbon infiltrated boron nitride in its hexagonal form as a detector of thermal neutrons. When exposed to thermal neutrons, this material has been found to scintillate or emit more light photons per thermal neutron than materials heretofore employed as neutron detectors. In one presently preferred embodiment, the boron nitride is enriched with Boron-10, and for neutron radiography, a single emulsion radiographic film is placed in direct contact with a carbon activated face of the boron nitride.

BRIEF DESCRIPTION OF THE DRAWING

The single FIGURE of drawing is a schematic view of one embodiment neutron radiography system utilizing a neutron detector according to the invention.

DETAILED DESCRIPTION

It has been found that boron nitride, in its hexagonal form, which has been infused with an impurity of carbon, either in an atomic form or in a molecular form, will strongly fluoresce or emit light when acted upon by thermal neutrons. It has further been found that the fluorescent or scintillating character of the material can be enhanced four fold, or more, by the use of boron which is enriched in the isotope Boron-10.

Boron-10 interacts very strongly with thermal neutrons, emitting one short range, highly ionizing alpha particle for each thermal neutron which it captures. It is believed that these alpha particles stimulate the emission of light in the blue-green region of the visible spectrum from the carbon infiltrated boron nitride.

A neutron radiography system utilizing the invention is illustrated in the drawing. This system includes a neutron source 11 comprising a nuclear reactor 12 in which Uranium-235 or other fissionable atoms are split to produce neutrons. The neutrons are passed through an aperture 13 to form a beam 14 which is directed through a helium-filled duct 16 to an imaging system 17.

The imaging system includes a conversion screen 18 which comprises a body or plate of carbon infiltrated hexagonal boron nitride 19 formed by hot pressing with a graphite die. The carbon from the die infiltrates into the boron nitride, with the face 21 of the body which faces the die thus becoming carbon activated. A single emulsion film plate 22 is placed directly against the boron nitride, with the emulsion in direct contact with the carbon activated face.

The conversion screen with the unexposed film is placed in the path of the neutron beam in a light-tight enclosure, with the film facing the source, and the object 24 to be examined being positioned between the source and the screen. Upon exposure, the film will be darkened wherever neutrons strike the screen, and an image of the object will thus be formed on the film.

While the invention has been described with specific reference to neutron radiography, it can be utilized in other applications where the presence of neutrons is to be detected, e.g. a radiation dosimeter. It can also be utilized advantageously in both imaging and non-imaging electronic devices such as photomultipliers, light amplifiers, image orthicons, and vidicons.

The invention has a number of important features and advantages. Boron nitride infiltrated with carbon is non-toxic, stable in air, machinable and available commercially. It emits substantially more light per thermal neutron than materials heretofore employed in neutron detectors, and the scintillating character of the material can be enhanced four fold, or more, by the use of boron enriched in Boron-10 which is also available commercially. Moreover, in radiography, there is no stray film darkening from capture gamma rays as there is with gadolinium.

It is apparent from the foregoing that a new and improved neutron detector and method have been provided. While only certain presently preferred embodiments have been described in detail, as will be apparent to those familiar with the art, certain changes and modifications can be made without departing from the scope of the invention as defined by the following claims.

We claim:

1. A neutron detector, comprising carbon infiltrated hexagonal boron nitride which emits light when acted upon by neutrons, means holding the boron nitride for exposure to neutrons, and means for detecting light emitted by the carbon infiltrated hexagonal boron nitride.

2. The neutron detector of claim 1 wherein the boron nitride is enriched in Boron-10.

3. The neutron detector of claim 1 wherein the means for detecting light includes a light sensitive film in proximity to the boron nitride.

4. In a method of detecting neutrons, the steps of exposing carbon infiltrated hexagonal boron nitride to the neutrons, and detecting light emitted by the carbon infiltrated hexagonal boron nitride in response to the neutrons.

5. The method of claim 4 wherein the boron nitride is enriched in Boron-10.

6. The method of claim 4 wherein light is detected by exposing a light sensitive film to light emitted by the boron nitride.

7. A neutron detector, comprising a body of hexagonal boron nitride having a carbon activated face which emits light in response to neutrons acting thereon, and a light sensitive film in proximity to the activated face for exposure to light emitted by the boron nitride.

8. The neutron detector of claim 7 wherein the boron nitride is enriched in Boron-10.

9. The neutron detector of claim 7 wherein the film comprises a single emulsion film in direct contact with the carbon activated face of the boron nitride.

10. The neutron detector of claim 7 further including means for exposing the boron nitride to the neutrons through the film.

11. In a method of detecting thermal neutrons, the steps of: providing a body of hexagonal boron nitride with a carbon activated face, placing a light sensitive film in proximity to the carbon activated face, and exposing the boron nitride to thermal neutrons which cause the boron nitride to emit light which is recorded on the film.

12. The method of claim 11 wherein the boron nitride is enriched in Boron-10.

13. The method of claim 11 wherein the film is positioned in direct contact with the activated face of the boron nitride.

14. The method of claim 11 wherein the boron nitride is exposed to the neutrons through the film.

* * * * *